US011875185B2

(12) United States Patent
Davis et al.

(10) Patent No.: US 11,875,185 B2
(45) Date of Patent: Jan. 16, 2024

(54) DETERMINING A VALIDITY OF AN EVENT EMITTER BASED ON A RULE

(71) Applicant: International Business Machines Corporation, Armonk, NY (US)

(72) Inventors: James Collins Davis, Blacksburg, VA (US); Willard Adams Davis, Rosendale, NY (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 17/325,057

(22) Filed: May 19, 2021

(65) Prior Publication Data

US 2022/0374265 A1  Nov. 24, 2022

(51) Int. Cl.
*G06F 9/48* (2006.01)
*G06F 11/07* (2006.01)
*G06F 9/54* (2006.01)

(52) U.S. Cl.
CPC ............ *G06F 9/4887* (2013.01); *G06F 9/542* (2013.01); *G06F 11/0757* (2013.01); *G06F 2201/86* (2013.01)

(58) Field of Classification Search
CPC .... G06F 9/4887; G06F 9/542; G06F 11/0757; G06F 2201/86; G06F 2201/865; G06F 11/302; G06F 11/3419; G06F 11/3612; G06F 21/552
See application file for complete search history.

(56) References Cited

U.S. PATENT DOCUMENTS 7,457,728 B2   11/2008   Chen et al.
8,543,534 B2    9/2013   Alves et al.
9,171,282 B2   10/2015   Yalamanchi
(Continued)

FOREIGN PATENT DOCUMENTS

WO      2019023542 A1    1/2019

OTHER PUBLICATIONS

Lee, B., "What They (probably) Didn't Teach You, Pt. 1: Node.js Event Emitters & Observer Pattern," Medium, May 22, 2017, 6 pages, retrieved from https://medium.com/@brianjleeofcl/what-they-probably-didnt-teach-you-pt-1-node-js-event-emitters-observer-pattern-7dd02b67c061.
(Continued)

*Primary Examiner* — Sisley N Kim
(74) *Attorney, Agent, or Firm* — Zilka-Kotab, P.C.

(57) ABSTRACT

A computer-implemented method according to one embodiment includes receiving data associated with a driver performing actions. At least some of the actions trigger events emitted by an event emitter. Information, from the received data, about the performed actions is logged in an action log. An event observer is instructed to log the events emitted by the event emitter that the event observer observes. The observed events are logged in an event log. The information of the action log and information of the event log is compared based on a rule, and a validity of the event emitter is determined based on results of the comparing. A computer program product according to another embodiment includes a computer readable storage medium having program instructions embodied therewith. The program instructions are readable and/or executable by a processor to cause the processor to perform the foregoing method.

20 Claims, 9 Drawing Sheets

(56) References Cited

U.S. PATENT DOCUMENTS

| | | | |
|---|---|---|---|
| 9,772,889 B2 | 9/2017 | Lu et al. | |
| 10,003,605 B2 | 6/2018 | Muddu et al. | |
| 2012/0260251 A1* | 10/2012 | Collins | G06F 11/3006 |
| | | | 718/100 |
| 2015/0142501 A1* | 5/2015 | Nair | G06Q 10/06316 |
| | | | 705/7.26 |
| 2018/0302268 A1* | 10/2018 | Lipkin | G06Q 20/202 |
| 2019/0005146 A1* | 1/2019 | Lu | G06F 3/04815 |
| 2019/0102244 A1* | 4/2019 | Tarlano | G06F 11/0787 |
| 2019/0132276 A1 | 5/2019 | Scheiber et al. | |
| 2020/0195662 A1 | 6/2020 | Black et al. | |
| 2022/0156240 A1* | 5/2022 | Smith | G06F 16/2358 |

OTHER PUBLICATIONS

Peters, C., "Understanding Event Emitters," CSS-Tricks, Mar. 25, 2019, 8 pages, retrieved from https://css-tricks.com/understanding-event-emitters/.

Boyd, S., "What the heck is an event emitter?" Medium, Jun. 6, 2019, 7 pages, retrieved from https://medium.com/swlh/what-the-heck-is-an-event-emitter-84407fce6cd3.

* cited by examiner

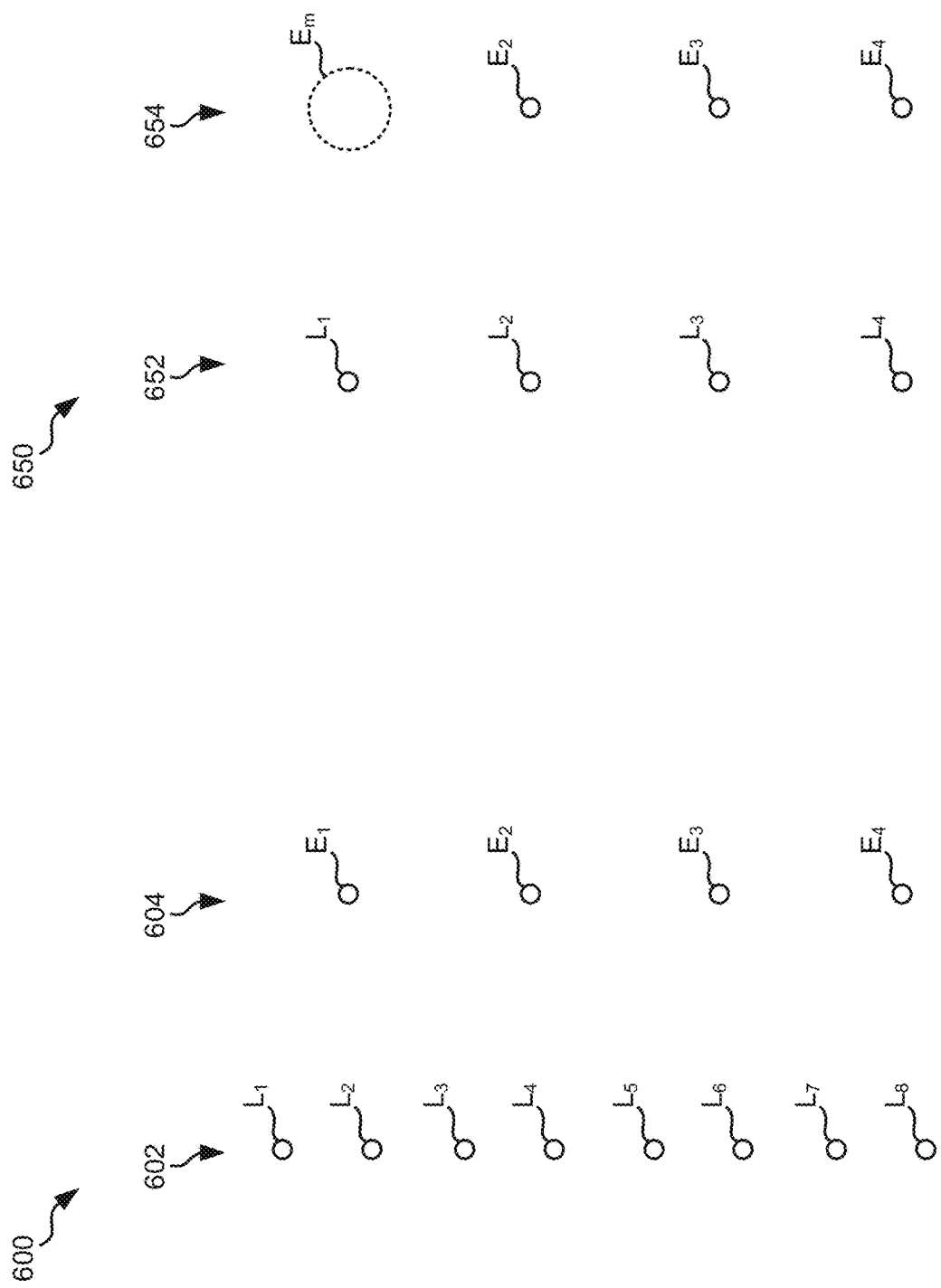

DETERMINING A VALIDITY OF AN EVENT EMITTER BASED ON A RULE

BACKGROUND

The present invention relates to event streams, and more specifically, this invention relates to determining a validity of an event emitter based on a rule.

An event emitter/event observer pattern has become a common design pattern. Many systems and frameworks provide some notion of an event emitter, where events emitted by the event emitter can be monitored by an event observer. Various non-limiting examples of event emitters and events of the event emitter that may be monitored by an event observer include: auditd's "audisp" event plugin, which may have events that are system calls; the inotify/fanotify/dnotify file system framework, which may have events that are file system accesses; message-passing and event-driven programming styles, such as in the Internet of Things (IoT) and robotics applications, where events may be from timers and sensors; client-side JavaScript programming, where events may be from browser client interactions; server-side programming frameworks, such as Node.js/JavaScript and TWISTED®/PYTHON®, where events may be, e.g., file system input/output (I/O), network I/O, etc.

SUMMARY

A computer-implemented method according to one embodiment includes receiving data associated with a driver performing actions. At least some of the actions trigger events emitted by an event emitter. Information, from the received data, about the performed actions is logged in an action log. An event observer is instructed to log the events emitted by the event emitter that the event observer observes. The observed events are logged in an event log. The information of the action log and information of the event log is compared based on a rule, and a validity of the event emitter is determined based on results of the comparing.

A computer program product according to another embodiment includes a computer readable storage medium having program instructions embodied therewith. The program instructions are readable and/or executable by a processor to cause the processor to perform the foregoing method.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 6A is a comparison of information in an action log and information in an event log, in accordance with one embodiment.

FIG. 6B is a comparison of information in an action log and information in an event log, in accordance with one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for determining a validity of an event emitter based on a rule.

In one general embodiment, a computer-implemented method includes receiving data associated with a driver performing actions. At least some of the actions trigger events emitted by an event emitter. Information, from the received data, about the performed actions is logged in an action log. An event observer is instructed to log the events emitted by the event emitter that the event observer observes. The observed events are logged in an event log. The information of the action log and information of the event log is compared based on a rule, and a validity of the event emitter is determined based on results of the comparing.

In another general embodiment, a computer program product includes a computer readable storage medium having program instructions embodied therewith. The program instructions are readable and/or executable by a processor to cause the processor to perform the foregoing method.

In another general embodiment, a system includes a processor, and logic integrated with the processor, executable by the processor, or integrated with and executable by the processor. The logic is configured to perform the foregoing method.

Figure 1:
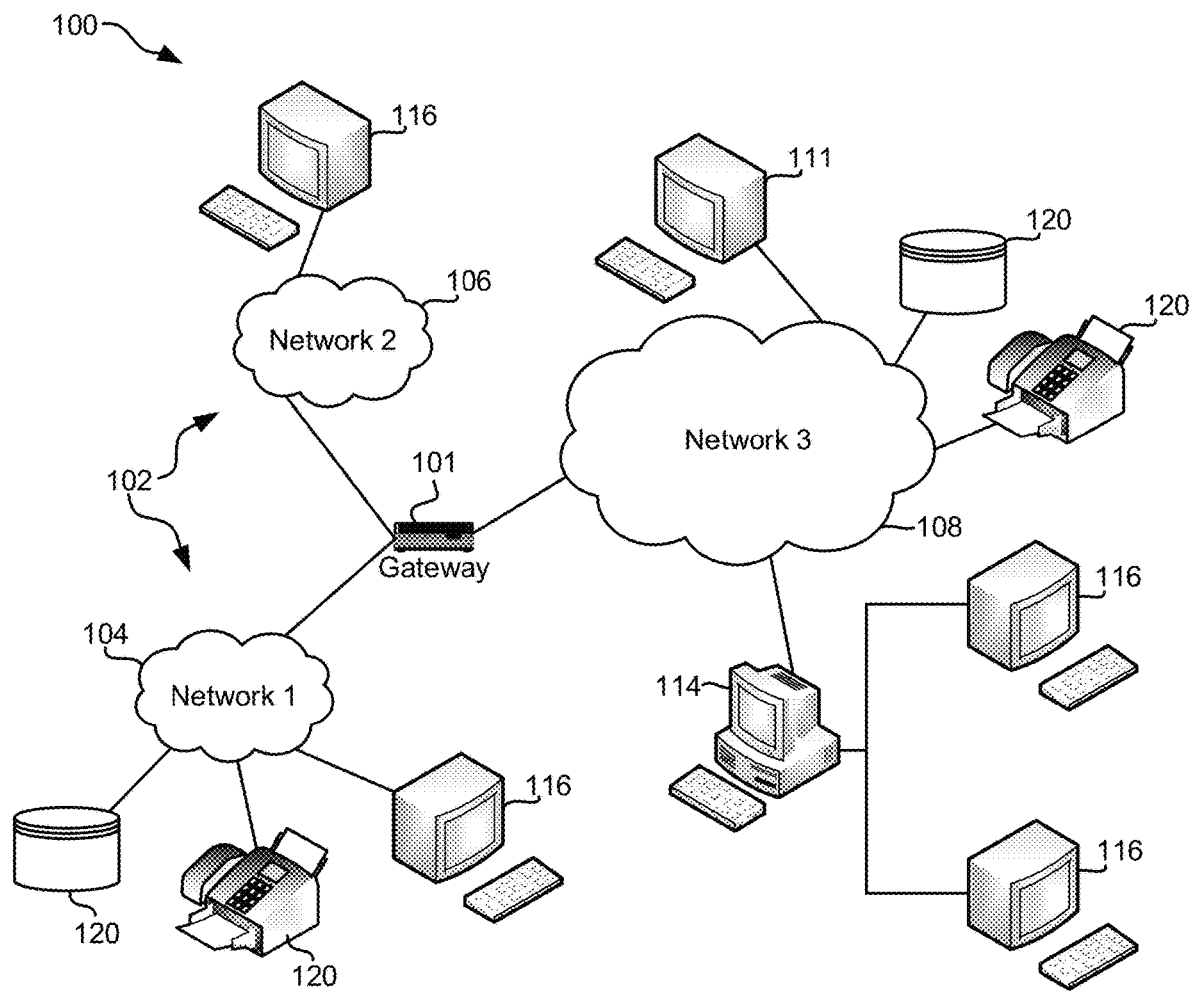
FIG. 1 is a diagram of a network architecture, in accordance with one embodiment of the present invention.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
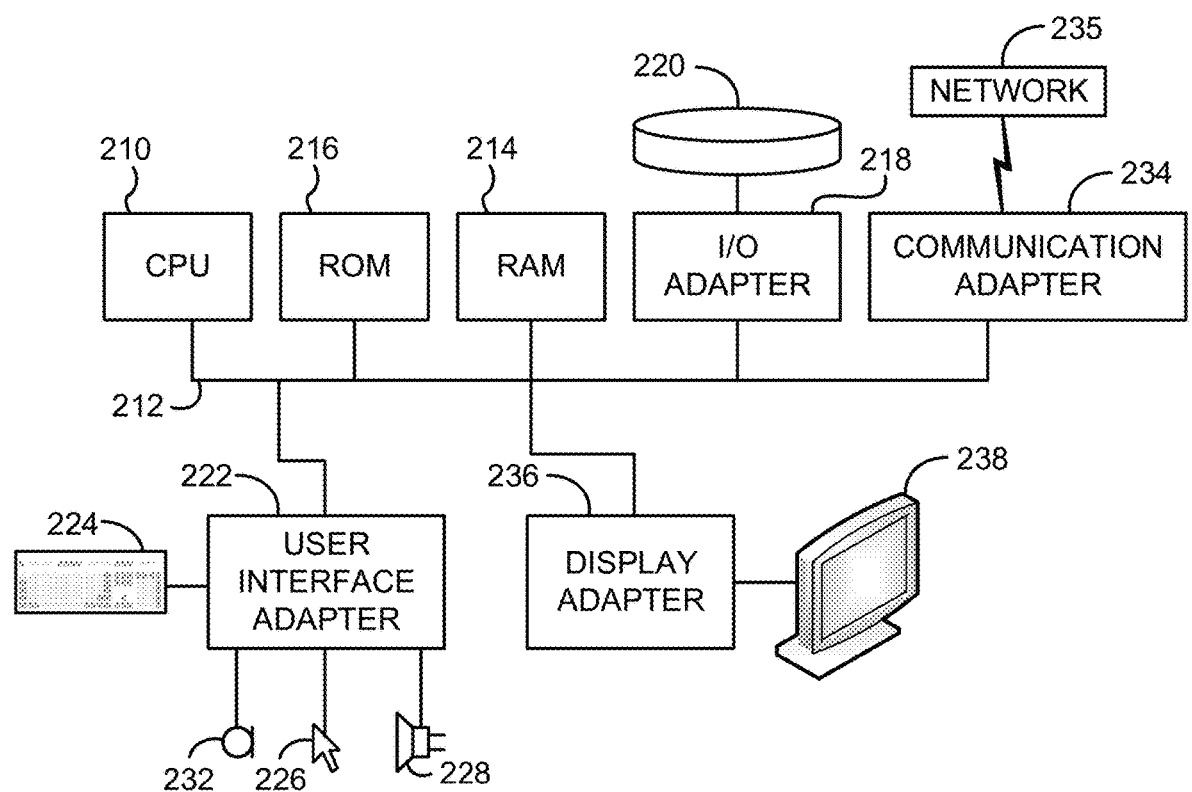
FIG. 2 is a diagram of a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
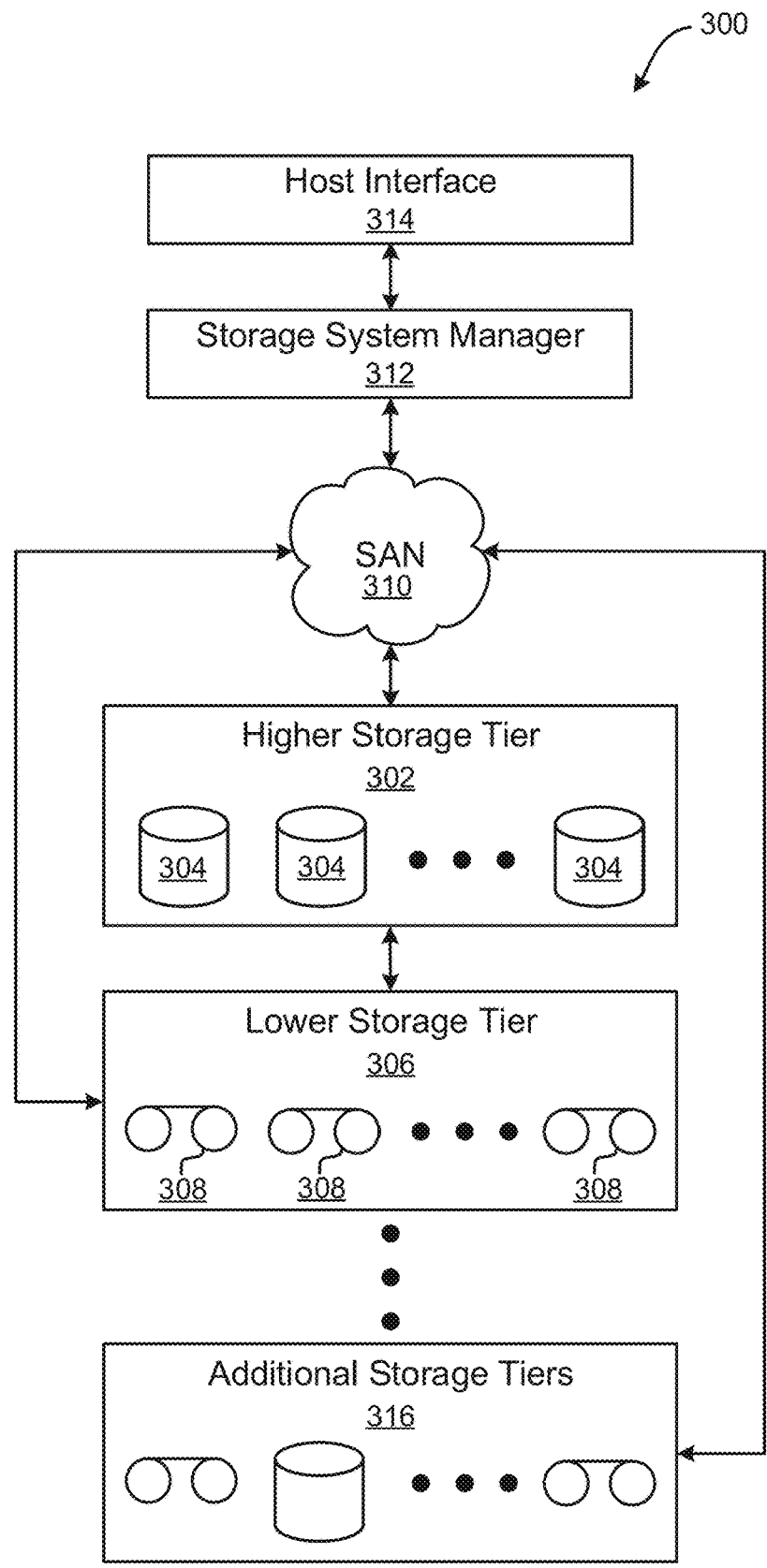
FIG. 3 is a diagram of a tiered data storage system, in accordance with one embodiment of the present invention.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned elsewhere herein, an event emitter/event observer pattern has become a common design pattern. Many systems and frameworks provide some notion of an event emitter, where events emitted by the event emitter can be monitored by an event observer. Various non-limiting examples of event emitters and events of the event emitter that may be monitored by an event observer include: auditd's "audisp" event plugin, which may have events that are system calls; the inotify/fanotify/dnotify file system framework, which may have events that are file system accesses; message-passing and event-driven programming styles, such as in the IoT and robotics applications, where events may be from timers and sensors; client-side JavaScript programming, where events may be from browser client interactions; server-side programming frameworks, such as Node.js/JavaScript and TWISTED®/PYTHON®, where events may be, e.g., file system I/O, network I/O, etc.

Despite the utility offered by the event emitter/event observer design pattern, when using the design pattern, it is important for the event observer to be able to trust that the event emitter emits events appropriately. More specifically, it is important that the errors do not occur as the event emitter emits events. In some instances, such an error may occur in the form of false positives/false events. For context, false positives/false events may occur when the event emitter emits an event, although nothing actually triggered the event. Errors may additionally and/or alternatively occur in the form of false negatives/dropped events, during which the event emitter fails to emit an event despite an event occurring that the event was triggered. It should be noted that these errors inside the event emitter may have negative consequences on the event observer. For example, false positives/false events may result in the event observer responding to an event that did not occur, e.g., unlocking a door in response to a "ghost" signal. In contrast, false negatives/dropped events may result in the event observer failing to respond to an event that did occur, e.g., failing to brake a self-driving car because a radar event was dropped.

In sharp contrast to the error prone conventional techniques described immediately above, various embodiments and approaches described herein enable validation of an implementation of an event emitter. It should be prefaced that there are several complicating factors that may exist in performing such a validation, e.g., event emitter validation problems. For example, one complicating factor may be rooted in the fact that different event emitters may have different properties. These different properties of the event emitters particularly complicate the applicability of techniques for validation of an implementation of an event emitter. In particular, these different properties of different event emitters may provide, e.g., different guarantees about a time between when an action triggers an event and when the triggered event is emitted (made visible to the observer(s)), and different guarantees about an order in which events are emitted relative to an order in which the actions that triggered the events occurred. According to another example, different properties of different event emitters may provide different guarantees about how many events event emitters emit relative to a number of event-triggering actions, e.g., for example to improve performance at the cost of complete accuracy. For such event emitters, "dropped events" may be a feature, not a bug. Various embodiments and approaches described herein define a general model for event emitters that describes various classes of event emitters. Using this model, rules that describe the acceptable behavior of an event emitter of any of these classes are enabled, as well as a testing methodology by which to validate an event emitter of any of these various classes. More specifically, various techniques described herein enable different instances of an event emitter validation problem, e.g., such as the errors associated with different classes of event emitters described above, to be solved by mapping them into different instances of either an iterated match or bipartite match problems. As will be described in greater detail elsewhere below, e.g., see method 400, within this testing methodology, the event emitters may be categorized by guarantees of the event emitters, e.g., timing guarantees, ordering guarantees, completeness guarantees, etc. A set of actions may be performed, in which a subset of the performed events are event-triggering. Information about these actions may be stored in an action log. Events that the event observer observes emitted by the event emitter under test may be collected and logged in an event log, which is compared with the action log to determine whether the event emitter is valid.

The timing and ordering guarantees mentioned above may affect which type of match problem is solved within the testing methodology. For example, for event emitters with relatively strict ordering guarantees, events and the actions corresponding to the events may be sorted according to time, with an iterated match carried out that compares each event-triggering action with the earliest-not-yet-claimed event. For context, a "claimed" event may be defined as an event that an event observer expects to occur, and thereafter identifies the occurrence of, from a set of unclaimed events. In contrast, for event emitters without relatively strict ordering guarantees, a bipartite graph may be built with events in a first set and actions in a second set. Moreover, edges may be added between nodes in each of the sets according to predefined time and equality rules. A maximal bipartite match may be searched for thereafter.

The completeness guarantees mentioned above may affect an acceptable outcome of the matching. For example, assuming that the event emitter guarantees that every event-triggering action yields an event, then a size of the maximal match must equal the number of actions (no dropped events) and the number of events (no false events). The event emitter may otherwise not guarantee that every event-triggering action yields an event. Assuming that the event emitter does not otherwise guarantee that every event-triggering action yields an event, then a size of the maximal match cannot exceed the number of actions (no false events). However, it may be more complicated to rule out the possibility of dropped events since dropping may occur by design in such a scenario. If an upper bound on the number of dropped events is able to be identified, then it may be confirmed that the size of the maximal match is at least as large as this. Moreover, assuming that the event emitter does not otherwise guarantee that every event-triggering action yields an event, the event emitter may guarantee that it will not emit events in some cases. If so, this provides an upper bound on the size of the maximal match.

In summary, various embodiments and approaches described herein include rules that describe the acceptable behavior of an event emitter of any of these classes are enabled, as well as a testing methodology by which to validate an event emitter of any of these various classes. As will now be described below, e.g., see method 400, in some approaches, the testing methodology may include: configuring an event emitter under test, and an event observer; instructing a driver to perform actions and/or determining that a diver has performed such actions, some of which are event-triggering; instructing an event observer to log, in an event log, the events that the event observer observes emitted by the event emitter; and comparing an action log with the event log based on the rules described above. In some approaches, these techniques may be used to validate the event emitter/event observer pattern incorporated in IBM's SPECTRUM® SCALE GENERAL PARALLEL FILE SYSTEM (GPFS) product. For example, the event emitter and event observer may be pre-configured in Lightweight Events and Watch Folders features of the GPFS, which enable distributed file system access monitoring at various levels of verbosity and granularity. However, approaches described herein may additionally and/or alternatively be implemented on any other event emitter/event observer systems.

Figure 4A:
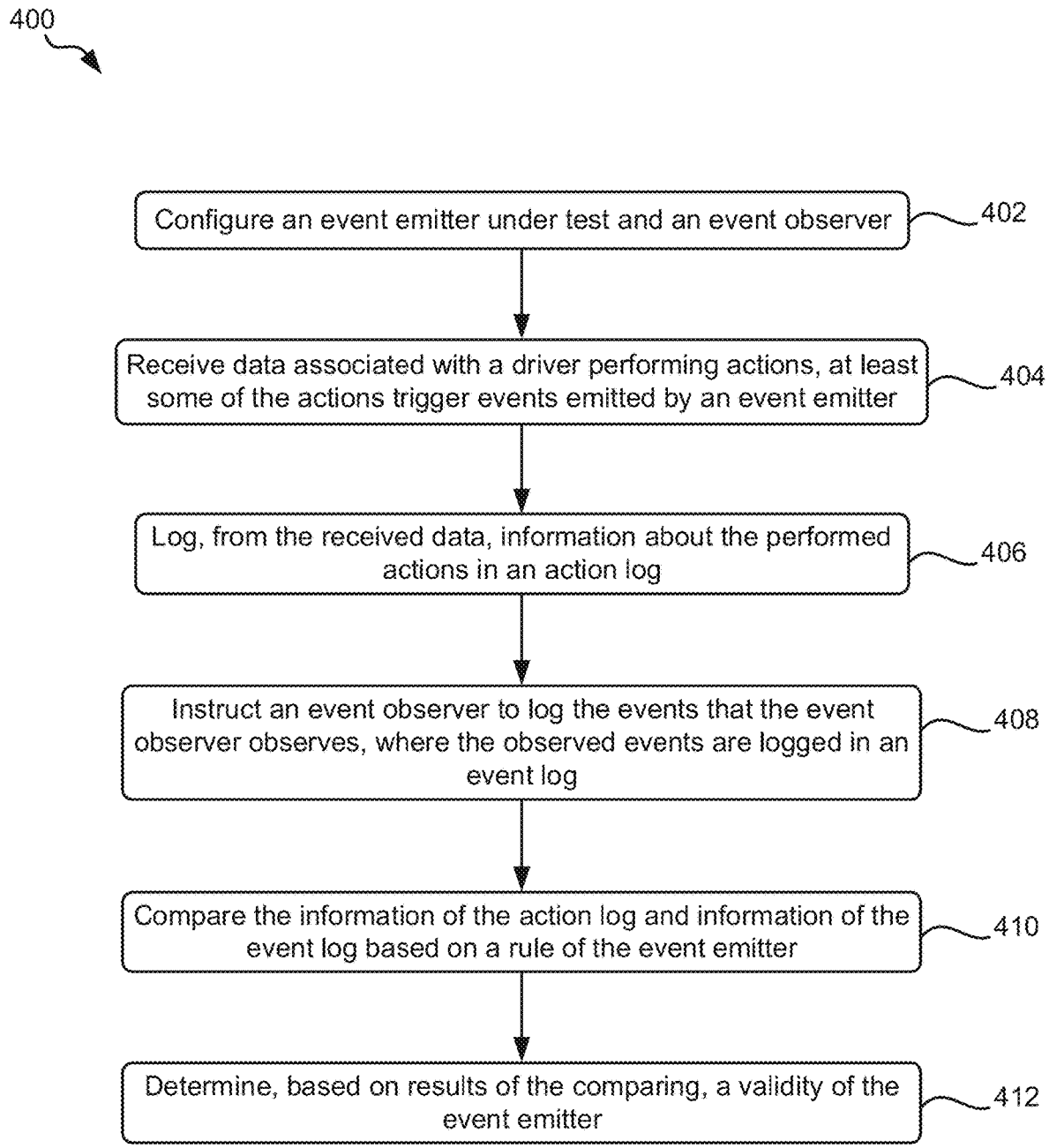
FIG. 4A is a flowchart of a method, in accordance with one embodiment.

Now referring to FIG. 4A, a flowchart of a method 400 is shown according to one embodiment. The method 400 may be performed in accordance with the present invention in any of the environments depicted in FIGS. 1-3 and 5B-9B, among others, in various embodiments. Of course, more or fewer operations than those specifically described in FIG. 4A may be included in method 400, as would be understood by one of skill in the art upon reading the present descriptions.

Each of the steps of the method 400 may be performed by any suitable component of the operating environment. For example, in various embodiments, the method 400 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

Optional operation 402 of method includes configuring an event emitter under test and an event observer. Configuring the event emitter under test and the event observer may in some approaches include establishing at least one event emitter, which may be of a known type. Moreover, in some approaches, configuring the event emitter under test and the event observer may in some approaches include defining a driver and/or actions of the driver that are to be monitored for and/or instructed to be executed. The driver and the actions of the driver may vary depending on the system configuration. For example, for a system that is configured to unlock a door in response to a determination that a radio-frequency identification (RFID) card having a predetermined configuration has been swiped on a known type of card reader, the driver may be a user that swipes the RFID card on the card reader or the card RFID itself, and the system may, as a result of detecting the RFID card having the predetermined characteristics, generate an event that includes unlocking the door. For context, vocabulary associated with the event emitter as well as vocabulary that defines different classes of event emitters that may be exercised in various approaches described herein will now be described below. An event emitter evaluates conditions to determine whether or not to emit an event. Conditions may change as a result of actions taken by some (typically external) actor, e.g., a driver. In some preferred approaches that are related to computer systems, the actors may be processes. The actions of processes may be described by their type, e.g., an open syscall, and have an ordered starting time and a stopping time such that starting times are always before, e.g., smaller than, stopping times. The term "action lifetime" may be used to refer to the time between the action starting time and the action stopping time. Process actions may overlap with one another, i.e., concurrency, with a condition that the process actions are all linearized against some global clock such that every starting and stopping time may be unique relative to all other times.

Operation 402 of method 400 is indicated as being an optional operation elsewhere above because in some approaches, the event emitter and/or the event observer may be preconfigured.

In the event that an action triggers a condition in the event emitter, the event emitter may eventually emit an event. This emission preferably contains at minimum, a timestamp and event type, but depending on the approach may additionally include more detailed information. Events may be a point in time, while actions may occur over a range of time. For example, a request to write data might take thirty seconds on a busy file system, but the corresponding event may be emitted at the point of time that the request finishes. It may be assumed that not all events may be under the control of the event observer, e.g., non-configurable "out of space" events intended for administrators, but that the event observer can identify such events by type.

Various dimensions in which the event emitters may be considered will now be described below.

Event Emission Medium

An event emission medium may refer to how events are communicated from the event emitter to the event observer. It may be assumed in various embodiments and approaches described herein that some medium capable of communicating whatever event information the event emitter calls for exists. For example, in one approach this medium may be the file system, e.g., events written to a file. In another approach this medium may be the system memory, e.g., events written to shared memory. In another approach this medium may be a database, e.g., events stored as records in a table. In yet another approach this medium may be a message queue system, e.g., such as APACHE KAFKA®.

Various examples of an event emission medium include, a log written to a computer, a physical log, network traffic such as a generated network event, a burst of radio waves that result in data being written, databases, use of a credit card resulting in information being logged into bank records, etc. The event emission medium may be a dimension that is considered when implementing operations of method 400 into a system. For example, where the event emission medium is a burst of radio waves, it may be considered that an antenna should be added and/or utilized in the system in which method 400 is being implemented in order to utilize the radio waves.

Event Conditions

As mentioned elsewhere above, an event emitter may evaluate conditions to determine whether or not to emit an event. Accordingly, event conditions may include formulas and/or mechanisms that are used to determine the condition(s) under which an event may be emitted. In some approaches, conditions may be defined by predefined rule-based language. For example, where the event emitter and/or event observer exist in a file system-based environment, the system may include various logical predicates and comparison operators which define what is to be monitored for, as well as define a set of conditions that can be applied to what is being monitored for. According to various specific examples, monitoring may be used to, e.g., measure a number of bytes that are left in a storage system, measure whether a user has modified data in a file system, determine once a file system has run out of storage space, etc. Note that, depending on the approach, conditions may be prescriptive, e.g., providing an exact set of things that can be requested, or alternatively the conditions may be descriptive such as based on input received from a user device, e.g., where a set of rules may be defined using an additional language of some kind.

An event emitter may emit more than one type of event, and each event type might be triggered under a variety of conditions. For example, under the condition "Free bytes<1 MB" a file system may be configured to emit an "out of space" event. According to another example, under the conditions "user modifies a file they do not own" or "user creates a file and assigns it to another user," a file system auditing framework may decide to emit an "unauthorized access" event.

Event Verbosity

Event verbosity is an amount of detail that an event emitter emits for an event. For example, according to various approaches, event verbosity may expose a number of events to a user through a counter, emit highly descriptive events including, e.g., event type, time, ID of an actor triggering the event, etc., emit events in a bit vector, etc.

In one preferred approach, method 400 may include considering accumulated, i.e., summative, events of the event emitter configured in operation 402, where a number of events that have occurred since a predefined event, e.g., such as a last time that the number events was checked, may be inspected. For example, the event emitter may emit an event of the form "the file has been read seven times in the last hour" rather than the event emitter emitting separate events for each read that occurs. Method 400 may additionally and/or alternatively include considering distinct events of the event emitter configured in operation 402, where each event that the event emitter emits may be inspected. For example, the event emitter may emit an event for each of the seven reads of the example above, with a predetermined level of detail.

In typical systems, a degree of verbosity that is considered, e.g., logged, translates directly to a computational cost. Accordingly, verbosity may be tuned according to constraints of the event emitter itself.

Event Timing

Event timing describes whether events are guaranteed to be emitted during the lifetime of the triggering action, e.g., synchronous, or whether the events may also be emitted after the lifetime of the triggering action, e.g., asynchronous events are not guaranteed to be emitted during a time of the event itself. Moreover, in some approaches, timing guarantees may define guarantees from the event emitter about when a record of an occurrence is emitted, relative to a time that the occurrence actually occurred. It should be noted that these descriptions may assume that the triggering action of the driver is not a point in time, but instead the triggering action may have a starting time and an ending time, e.g., see FIGS. 7-9A. This is because if the triggering action existed at only a single point in time, synchronicity could not occur and instead only asynchronicity would be possible. Various preferred approaches consider both synchronous and asynchronous event emitters.

Event Ordering

Event ordering describes whether events are guaranteed to be emitted in some order consistent with the starting or ending times of the actions that produced them, e.g., ordered, or whether the event emitter makes no guarantee about the order of events relative to the triggering actions, e.g., unordered.

Depending on the approach, an ordered event stream may be fully or partially ordered. A fully ordered event stream guarantees a complete order of events according to some global clock, e.g., ordered by the time at which each action begins. In contrast, a partially ordered event stream guarantees an ordering between subsets of events, e.g., "all events to a particular file are emitted in access order", or "all non-overlapping events are emitted in the order in which they occurred, but overlapping events can be in either order."

Event Completeness

Event completeness describes whether the event emitter guarantees that it will emit an event for every event-triggering action, or whether it is permissible to emit a subset of events, e.g., there are zero events considered to be missing where it is determined that there are fewer events than event-triggering actions, or a superset of events, e.g., such as where fictitious events occur in that it is determined that there are more events than event-triggering actions.

In the event that the event emitter emits a subset of the possible events, this may be due to throttling and/or sampling policies. A throttling event emitter may end up not emitting more than a certain number of events in a given time window, e.g., in order to reduce network load. Only a fraction of the events may be intentionally emitted by a sampling event emitter, e.g., every third event, every fifth event, every tenth event, etc., to allow an event observer to gain a sense of activities without having to monitor everything. This may decrease the overhead associated with maintaining an event emitter and may potentially be particularly applicable in relatively event-heavy contexts. In some preferred approaches, complete, throttled, and sampling event emitters are considered.

The six dimensions described in detail above may be used to describe and furthermore used to determine the validity of one or more real-world event emitters configured in operation 402. For purposes of an example, dimensions of an approach in which the event emitter is the auditd framework, and the event observer is an audisp plugin will now be described. In such an approach, the event emission medium may be the auditd framework writing events into the memory of the plugin, and the event conditions may be the auditd framework exposing a set of events. The event conditions may further include that a plugin can use the auditd application programming interface (API) to define the conditions under which auditd is to emit events. Regarding event verbosity, the auditd framework may provide distinct, highly verbose events including a timestamp, the event type, the triggering process, the affected file, etc. For event timing, events may be emitted synchronously. Moreover, the triggering action may be a system call that blocks until the event observer handles it. It should be noted that the auditd framework can also be used asynchronously in some approaches in which the event emitter may emit events to a file and the event observer can read them at a leisure of the event observer. For the event ordering, events may be specified to be emitted at the time when the event-triggering action, e.g., a system call, reaches the auditd framework's hook. Accordingly, the current example includes a fully ordered event emitter. Moreover, for event completeness, the auditd framework may be configured in a throttled mode, e.g., configured to drop events in the event that it is determined that more than a predetermined number of events occur, or in a complete mode, e.g., guarantee that all events will be emitted, or the system will crash.

With continued reference to method 400, in some approaches, configuring the event emitter under test and the event observer may include establishing one or more rules for determining a validity of the event emitter. Such rules may be used in one or more comparisons for testing the validation of the event emitter will be described in greater detail elsewhere herein, e.g., see operation 410 of method 400. In yet another approach, configuring the event emitter under test and the event observer may include establishing a period of time that testing for the validation of the event emitter is to occur, e.g., during a period of time in which a system that includes the event emitter and/or event observer has at least a predetermined amount of processing resources available.

Data associated with a driver performing actions may be received, e.g., see operation 404 of method 400. At least some of the actions preferably trigger events emitted by an event emitter. At least some of the events, are observed by the event observer. Note that in some preferred approaches, each of the triggered events are observed by the event observer. The event observer is instructed to log events that the event observer observes, e.g., see operation 408. More specifically, the event observer may be instructed to observe for an event's presence or absence in some approaches. Details of the event that are logged may be specific to a domain. For example, an event from a self-driving car may include, e.g., speed, direction, vehicle class, etc. In contrast, an event from a badge-reader may include, e.g., time, name, security clearance, etc. In some approaches the event observer may be instructed to log all events that the event observer observes. In some approaches, the events that the event observer observes may be limited to events that are specifically emitted by event emitter. However, in some other approaches, the event observer may be instructed to log the events emitted by more than one event observer, e.g., events emitted by the event observer and events emitted by a second event observer. The event observer may in some approaches log the events that the event observer observes without being instructed to do so. The events may be logged by the event observer into an event log, or into any other known type of write location. In some approaches, the event log that contains the events logged by the event observer may be readily accessible by a device performing method 400. In another approach, assuming that the event log is not readily accessible by the device performing method 400, an operational operation of method 400 includes receiving the event log that contains the events logged by the event observer.

Operation 406 includes logging, from the received data, information about the performed actions, e.g., see operation 406. According to various approaches, the information about the performed actions may include, e.g., timing information, information about any one or more of the event emitter dimensions mentioned elsewhere above (conditions, verbosity, timing, ordering, completeness), etc. In some approaches the information about the performed actions may be logged in an action log, e.g., an application log. Logging information about the actions into the action log may be performed using a known type of program that is configured to input events into a system that includes the event emitter and/or event observer. In some preferred approaches, the action log includes the same types of data as the types of data that are stored the event log, e.g., so that data of the logs can be easily compared. However, in some other approaches, the action log may include at least one type of information that does not exist in the event log. For example, the action log may include information associated with a mix of "real events" in addition to information associated with "artificially inserted test events," along with a record that distinguishes the different types of information. Such information may be metadata that may be used for running testing, e.g., a comparing of the logs. Despite the action log and the event log including different types of information in such approaches, the action log preferably includes a sufficient amount of data for comparing the action log with the event log.

Logging of the information about the performed actions may be performed in response to an instruction being output to the event emitter to log the information in the action log. In an alternative approach, the information may be logged in the action log in response to a determination that events are being emitted by the event emitter, which may be based on, e.g., a determination that one or more actions that trigger the events emitted by an event emitter have occurred, an event being initially observed by the event observer, etc.

In some approaches, the information of the action log and information of the event log may be compared to determine a validity of the event emitter. For context, such a determination may be useful because, as described elsewhere herein, allowing an event observer to observe an event emitter that has not been verified may result in false positives/false events and/or false negatives/dropped events occurring in a system that utilizes the event emitter and/or event observer. Operation 410 includes comparing the information of the action log and information of the event log based on a rule of the event emitter. The rule of the event emitter may describe an acceptable behavior of an event emitter of any of one or more predefined classes of event emitters. As will be described in greater detail elsewhere below, e.g., see operation 412, a testing methodology by which to potentially validate the event emitter may be based on whether results of the compared information of the action log and the information of the event log conform to the rule of the event emitter. Several non-limiting examples of rules for acceptable behavior of the various dimensions of an event emitter, will now be described below.

In some approaches, an event emitter may be tested by combining rules for each of the dimensions of the event emitter. Hybrid event emitters may be present in some approaches, and may be validated using a combination of the rules described below. More specifically, a hybrid event emitter may be thought of as being different sub-event emitters with potentially different distinct dimensions, because the hybrid event emitter may be a single logical event emitter that is configured to emit multiple event streams. For example, within a context of an event emitter and event observer within a filesystem, there may be rules that detail the state of the files in the filesystem, and that have different amounts of verbosity and guaranteed at different amounts of ordering. Additionally, there may be a separate set of rules that relate to the user's interaction with the filesystem, where the separate set of rules that have a distinct configuration of properties of the filesystem. In such an example, in order to test the hybrid system, the single logical event emitter may emit multiple event streams that are each potentially validated using a different set of the rules of the event emitter.

It may be prefaced that in some approaches some of the rules may interact with one another in ways described in the section further below, e.g., see Testing methodology.

For some of the rules, a series of actions, e.g., act1, act2, act3, etc., may be assumed. Furthermore, as will now be detailed below, rules based on some dimensions of the event emitter may be relatively simple, e.g., medium, conditions, verbosity, while in contrast, rules based on some other dimensions of the event may be relatively more complicated, e.g., timing, ordering, completeness.

Rules for an Event Emission Medium of an Event Emitter

In some approaches, a rule of the event emitter may specify that the event emitter must emit events to a medium according to a specification of the event emitter, e.g., writing to a file, publishing through an API, etc. Validation of such a rule is relatively straightforward because the event emitter either does or does not use the medium. For example, in order to determine whether an event emitter uses a predetermined medium where the event emitter is supposed to log events in a predetermined log, the log may be simply inspected in order to determine if the event emitter is valid, e.g., where the inspection may include determining whether a number of events that were supposed to be added to the event log based on settings of the event emitter, are present in the event log.

Rules for Event Conditions of an Event Emitter

In some approaches, a rule of the event emitter may specify that the event emitter must emit events according to one or more condition defined by a user. A process for user actions intended to trigger these conditions is outlined elsewhere below, e.g., see Testing methodology.

Rules for Event Verbosity of an Event Emitter (for Accumulated Event Emitters and Distinct Event Emitters)

For both accumulated event emitters and distinct event emitters, a requirement may include that the events emitted from the event emitter into the event emission medium are able to be retrieved, e.g., for a user. This may be satisfied in some approaches based on a counter, i.e., accumulated, or per-action events, i.e., distinct. The events preferably contain predetermined data according to the specification of the event emitter. For example, for a distinct-style event emitter, events may include predetermined information that includes, e.g., an event type, a time, a user that performed an action that triggered the event, a component of a system that triggered the event, etc.

Rules for Event Timing of an Event Emitter

In some approaches, the rule of the event emitter may be based on a timing guarantee. More specifically, in one approach, the timing guarantee may specify that each of the events must be emitted by the event emitter during performance of a corresponding one of the actions by the driver. Such an approach may refer to a synchronous event emitter, e.g., "events must be emitted at some point during the corresponding action." More specifically, the timing guarantee of the synchronous event emitter may specify that for each action, e.g., act, for which the event emitter has emitted an event, e.g., evt, it must be that act.start_time<evt.emit_time<act.end_time. In another approach, the rule of the event emitter may be based on a timing guarantee of an asynchronous event emitter. More specifically, the timing guarantee may specify that each of the events cannot be emitted by the event emitter before a corresponding one of the actions begins. Instead, in the asynchronous case, the event may be emitted any time after the action begins, which can be during performance of the event, e.g., like a sync event, or afterwards. For example, for each action, e.g., act, for which the event emitter has emitted an event, e.g., evt, it must be that act.start_time<evt.emit_time. It should be noted that these timing based rules may in some approaches be relatively straightforward to apply for a distinct-style event emitter, e.g., verbosity. However, for an accumulate-style event emitter, these rules may be relaxed in a manner familiar to one of ordinary skill in the art. In some approaches, the same may be true for the rules for event ordering and event completeness described elsewhere below.

Rules for Event Ordering of an Event Emitter

The rule may in some approaches be based on an ordering guarantee for a fully ordered event emitter, e.g., events are emitted in action order. An ordering guarantee for a fully ordered event emitter may in some approaches specify that for each pair of actions, e.g., act1, act2, for which the event emitter has emitted corresponding events, e.g., evt1, evt2, it must be that the events are ordered according to the ordering mechanism. For example, if the ordering is on the action start time, it must be that if act1.start_time<act2.start_time, then evt1.time<evt2.time.

In another approach, the rule may in some approaches be based on an ordering guarantee for a partially ordered event emitter, such that events are emitted by the partially ordered event emitter in action partial order. An ordering guarantee for a partially ordered event emitter may in some approaches specify that for each pair of actions, e.g., act1, act2, for which an ordering is enforced, e.g., read and write on the same file, and for which the event emitter emitted corresponding events, e.g., evt1 and evt2, it must be that the events are ordered, e.g., denoted by "<", according to the ordering mechanism. For example, assuming that act1 must have happened before act2, then event evt1 must have occurred before the event evt2 (i.e., if act1<act2, then evt1<evt2). If there is no enforced ordering between a pair of actions, then the ordering dimension preferably does not require any ordering between their corresponding events, although an ordering may be called for by the event timing dimension.

In another approach, the rule may in some approaches be based on an ordering guarantee for an unordered event emitter. For all pairs of actions, the ordering guarantee for an unordered event emitter may be the same as for any pair of unordered actions in a partially ordered event emitter.

Rules for Event Completeness of an Event Emitter

In another approach, the rule of the event emitter may in some approaches be based on a completeness guarantee for a complete event emitter. More specifically, the completeness guarantee of the event emitter may specify that each event-triggering action yields an event, such that for every action, e.g., act, there must be a corresponding event, e.g., evt. More specifically, the rule may specify that a size of a maximal match is equal to the number of the actions performed, e.g., no dropped events, and the number of events triggered by the actions, e.g., no false events.

In another approach, the rule may in some approaches be based on a completeness guarantee for a throttling event emitter. More specifically, the completeness guarantee of the throttling event emitter may specify that an action may result in an event, subject to a predetermined throttling mechanism. In such an approach, for every action, e.g., act, there may be a corresponding event, e.g., evt. A nature of the throttling mechanism may determine an extent to which events may be missing. For example, assume that the throttling mechanism asserts that at least one event should be emitted for each one-minute window in which an event occurs. Based on such a throttling mechanism, then it should be that for a sequence of actions, e.g., act1, act2, act3, etc., there should be at least one event, e.g., evtX, for each 60-second window of events. The presence of such events may be determined from the event log.

It should be noted that some approaches may be based on dynamic throttling. In one approach, dynamic throttling may include emitting an event for every detected event-triggering action of the driver provided that a rate of occurrence of the actions is less than a predetermined threshold. In response to a determination that the rate of occurrence of the actions is greater than or equal to the predetermined threshold, events may be adjusted to be emitted only once for every predetermined number of event-triggering actions that occur. In some approaches, in order to obtain action log information and event log information for testing a dynamic throttling event emitter, method 400 may include instructing the driver to perform event-triggering actions for a first predetermined amount of time at a rate of occurrence of the actions that is less than the predetermined threshold, and furthermore instructing the driver to perform event-triggering actions for a second predetermined amount of time at a rate of occurrence of the actions that is greater than or equal to the predetermined threshold. In this testing scenario, a rule for validating the dynamic throttling event emitter may specify a number of events that are expected to occur within the first predetermined amount of time and specify a number of events that are expected to occur within the second predetermined amount of time. In such an approach, validation of the dynamic throttling event emitter may be determined based on whether a comparison of information of the action log and information of the event log indicate that the event emitter emitted according to the rule. For example, the event emitter may be determined to be valid in response to a determination that the results of the comparing indicate that the event emitter emitted according to the rule, and the event emitter may be determined to not be valid in response to a determination that the results of the comparing indicate that the event emitter did not emit according to the rule.

Although some approaches described elsewhere herein detail that throttling that is based on a set of known variables, in some other approaches, the throttling may be based on variables that are not known to the event observer. For example, in one approach, the variables may specify that the event emitter is running on a system having rules that specify that if a CPU of the system is determined to be over-utilized according to a predetermined CPU parameter, all events emitted by event emitters may be delayed.

A system in which a throttling event emitter may be utilized may be a system that is configured to monitor a flow of different chemicals, where periodically a bar of iron is added to the flow of chemicals such that the flow of chemicals is able to react with the bar of iron. In such an approach, a first rule may be applied periodically to a hybrid event emitter of the system while the flow of chemicals without the iron is detected, and a second rule may be applied to the hybrid event emitter in response to the bar of iron being detected.

In another approach, the rule may in some approaches be based on a completeness guarantee for a sampling event emitter. More specifically, the completeness guarantee of the sampling event emitter may specify that an action may result in an event, subject to the sampling mechanism. For every action, e.g., act, there may be a corresponding event, e.g., evt. The nature of the sampling mechanism determines the extent to which events may be missing. For example, the sampling event emitter may sample at a rate of 0.1, i.e., the sampling event emitter emits exactly one event for one out of every ten actions. Then for every ten event-producing actions that are taken, exactly one should have a corresponding event.

The rule may be incorporated into a predetermined testing methodology of method 400 in order to determine a validity of the event emitter. For example, operation 412 of method 400 includes determining, based on results of the comparing, a validity of the event emitter. The determined validity may in some approaches be output, e.g., in a report to an administrator of a system that includes the event emitter, to a function that is configured to pause functionality of the event emitter in response to a determination that the event emitter is invalid, to a function that is configured to allow functionality of the event emitter to continue in response to a determination that the event emitter is valid, etc. As a result, performance of a system and/or computer that includes the event emitter is improved as the event emitter is prevented from emitting events while invalid and/or as a result of administrators being alerted to the presence of an event emitter that invalid. The determination may in some preferred approaches be based on whether the information of the action log and the information of the event log match according to the rule of the event emitter, e.g., where the event emitter is determined to be valid in response to results of the comparing indicating a match exists between the information and where the event the event emitter is determined to not be valid in response to results of the comparing not indicating a match exists between the information. Various more specific approaches will now be described below that detail a testing methodology that may be used to perform the determination of the validity of the event emitter.

Testing Methodology

In some approaches, the rule of the event emitter may be used in a testing methodology by which to validate an untrusted event emitter, e.g., an event emitter that has not yet been tested. Event emitters may take on varying values in the medium, conditions, and verbosity dimensions without overly disrupting the methodology below. It may be assumed that the conditions are known and that actions can be mapped to the event(s) that may emitted based on the conditions in place.

The testing methodology may include a methodology to generate events. Similar to optional operation 402, the methodology to generate events may include configuring the event emitter according to the set of conditions of interest. Several distinct configurations may be tested, depending on the approach. A mix of actions may be performed according to the event emitter configuration. In some approaches a portion of the performed actions trigger events, while another portion of the events do not trigger events. A trace of the actions may be recorded, e.g., in a log. In some preferred approaches, the trace of the actions include start and end times of the actions. The actions may in some approaches be performed on various computing devices on which the event emitter is configured to emit events. For example, in some systems in which IBM's SPECTRUM® SCALE is implemented, actions may be taken on both on a single node in a cluster and on several nodes in the cluster, from one and from several processes on each node, and a unified action trace is preferably collected across all participating nodes and processes. The methodology to generate events may furthermore include performing the actions sequentially, such that no two actions are active at the same time, e.g., no action begins while another action has not ended. In contrast, the methodology to generate events may include performing the actions in parallel, such that two actions may overlap in time. In summary, the methodology to generate events may include performing several actions and collecting the action trace. The action trace may be used in matching, and/or one or more operations, as will be described elsewhere below.

It may be noted that a methodology to collect events, may in one approach include, after configuring the event emitter, configuring an event observer to monitor events according to the mechanism exposed by the event emitter under test. The methodology to collect events may furthermore include collecting and storing the events emitted by the event emitter, e.g., the collected and stored events is described elsewhere herein as the "event trace." Known techniques for collecting the events and known techniques for storing collected event traces may be used in such an operation. The event trace is preferably collected until a predetermined amount of time elapses, e.g., ten seconds, one minute, one hour, etc., from a completion of the last action, according to timing guarantees of the event emitter.

Determining a validity of the event emitter may in some approaches include performing an iterated match. Such an approach may be utilized in the special case in which the event emitter is synchronous, fully ordered, and complete. This case is important because it corresponds to a common "minimum viable product" mode during event emitter development, when the system may be deliberately slowed to facilitate testing and debugging. In this case, operations of the testing methodology described above may be followed to obtain an action trace and an event trace. Because of the properties of the event emitter in this case, there should be a one-to-one correspondence between the event trace and the trace of event-triggering actions. The event emitter can be validated by, for each action in the trace, finding an earliest corresponding event and marking it off. In some approaches, metadata about the action may additionally and/or alternatively be considered, e.g., the driver program submits a read against file X, and the event, e.g., the program observes a read against file X, as additional validation. In some approaches, the event emitter may be determined to be valid in response to results of the comparing indicating that each action triggered an event. In contrast, where the results of the comparing indicate one or more actions without events, or events without actions, it may be determined that the actions are in error, and the event emitter may be determined to be invalid, e.g., emitting not in conformance with the rule and/or dimensions of the event emitter such that errors may result.

Determining a validity of the event emitter may in some approaches include performing a bipartite match, e.g., matching emitted events with observed events. Bipartite matching is a relatively more sophisticated technique for determining a validity of the event emitter than iterated matching, and may be particularly useful for approaches in which the event emitter is not synchronous, not fully ordered, and not complete.

It may be prefaced that performing a bipartite match may include building a bipartite graph with events in a first set and actions in a second set, and adding edges between nodes in each of the sets according to predefined time rule and equality rules. Such time and equality rules may involve determining whether the recorded event qualifies as a match for a given action. If it is known that the event emitter is synchronous, i.e., the event must be recorded before the action is finished, and the action occurs from time $T_1$ to $T_2$, events that occur between $T_1$ and $T_2$ are checked for. This is an example of a time rule. Assuming that it is known that the event emitter can drop events, e.g., it is throttled to no more than X events logged per time interval T, then there may be X+5 events in the action log, but only X events in the event log. This may be determined to be acceptable due to the known throttling, however, if there was X+5 events in the event log may be determined to be a problem because at most X events are expected. These are examples of equality rules.

In an approach that provides a strict ordering, it may be verified that "action 1" corresponds to "event 1." In an approach that does not provide strict ordering, "action 1" may be checked against "event 1" and if there is determined to be a match, the process may proceed to verify "action 2." However, if there is not a match between "action 1" and "event 1," "action 1" may be checked against, e.g., "event 2," "event 3," etc. until we a match is identified. Assuming that there is not strict ordering or a guarantee that every action has an event, "action 1" may be compared against every element of the event log, and in response to a determination that there is no event, then the determination may be noted and the process may proceed to compare "action 2" against the event log.

With the bipartite graph built, a determination of the validity of the event emitter may be based on whether a maximal bipartite match is identified in the comparison of the information, e.g., the event emitter is determined to be valid in response to a determination that a maximal bipartite match is identified in the comparison of the information and the event emitter is determined to be not be valid in response to a determination that a maximal bipartite match is not identified in the comparison of the information. Relatively more detailed operations for building a bipartite graph and performing bipartite matching for determining the validity of the event emitter will now be described below.

As briefly mentioned above, in some approaches, validating the event emitter may include construct an empty undirected bipartite graph, e.g., one with two kinds of vertices, such that edges exist between different kinds of vertices but not between two vertices of the same kind. The two kinds of vertices in the bipartite graph may in some approaches be event vertices and action vertices.

For each event in the event trace, an event vertex, e.g., "e," may be created in the graph. If the event emitter verbosity is an accumulated event emitter and the event records "N" combined events, this vertex may be split into "N" vertices instead. Moreover, for each action in the action trace, an action vertex, e.g., "a," may be created in the graph. This vertex may be labeled according to whether or not the vertex should have a corresponding event according to the configuration of the event emitter. Each pair of events and actions may be considered. For each pair for which the event could correspond to this action according to the rules of the event emitter, an edge may be created between the vertices corresponding to this event and action pair. Thereafter, a maximal bipartite match may be computed on the graph. Note that there may be more action vertices than event vertices if the action trace includes actions for which events should not be emitted. The timing and ordering guarantees may be represented by the edges in the graph.

The completeness of the event stream may affect how validity of the event emitter can be tested. First, if the event emitter is complete, e.g., the event emitter emits an event for every action according to a configuration and verbosity of the event emitter, then the bipartite match should be maximal, with every event paired with a triggering action. If the match is not maximal, it may be determined that an error is present and should be reported, e.g., to an administrator of the event emitter. A determination that the event emitter is not valid may also be made in response to detection of such an error within the comparison of the information of the action log and the information of the event log. The action and event traces may also be useful as they can be used during problem determination, and the action trace can be replayed later to validate a proposed fix. During problem determination, it may be determined that the event emitter emitted too many events relative to the number of event triggering actions, e.g., unmatched events in the bipartite match. In such an approach, it may be helpful to add edges between the "false" actions that should not have triggered events, and the unmatched events, according to various hypotheses about the cause of the error. Depending on the approach, such hypotheses may be determined using known techniques for troubleshooting an event emitter. This may help developers understand possible causes of spurious event emissions, perhaps due to the incorrect implementation of the event emitter configuration, e.g., which affects which actions should trigger events. During problem determination, it may be determined that the event emitter emitted too few events relative to the number of event triggering actions, e.g., unmatched event-triggering actions in the bipartite match. In such an approach, the unmatched actions may be inspected to identify a commonality, e.g., using known techniques for determining commonalities between events, which could be output, e.g., to help developers understand possible causes of un-emitted events.

In some approaches in which the event emitter is a sampling or throttled event emitter, method 400 optionally includes performing analysis of the maximal match to determine an extent to which the sampling and/or throttling policies appear to be being followed by the event emitter. In order to perform such analysis, it may be considered that both the sampling and/or throttling policies should yield a bipartite graph with fewer event vertices than event-triggering action vertices. For a sampling event emitter, the proportion of unmatched event-triggering action vertices preferably correspond to the sampling rate. For a throttled event emitter, the times at which the event-triggering actions occurred should correspond to the throttling policy, with unmatched event-triggering actions corresponding to periods of high actions. Throttling event emitters may be particularly useful in scenarios in which a relatively large number of driver actions are occurring, e.g., such as computer systems performing hundreds, if not thousands of operations in a relatively short period of time, as the amount of information logged in the event log will be reduced from an amount of information that would otherwise be logged if the event emitter emitted an event for each of the actions performed by the driver. For both sampling and throttled event emitters, the bipartite graph may be modified according to the sampling or throttling policy prior to computing the bipartite match, such that a maximum bipartite match should result. For example, for a throttled EE, edges including event-triggering actions that occur in action-dense time epochs may be removed and the vertices converted to non-event-triggering actions. Accordingly, if a specification of a throttling mechanism of an event emitter is known in advance of events being performed, at least some of the information of the action log may be expected to not be correlated with at least some actions. For purposes of an example, suppose that the event emitter is throttled to show only "X %" of the events, or a max of X events. This may be common for approaches that implement Linux kernel logging, where there may be hundreds of thousands of events in an hour, but that many entries in the log would be overwhelming. Assuming that throttling is set to only 100 events in a minute, to verify this, testing may include submitting 10,000 events in a minute, so that the action log would have 10,000 events. In this the event log should only have 100 logged events.

A similar technique may be performed for a sampling event emitter according to a time or an order in which the event-triggering actions took place. Note that the iterative matching techniques described elsewhere herein may additionally and/or alternatively be implemented according to this bipartite match methodology in some approaches. In such approaches, a bipartite graph may result with only one edge from each event to each action due to the combination of rules for synchronous, fully ordered, and complete event emitters. In response to a determination that such a result occurs, the event emitters may be determined to be valid.

Figure 4B:
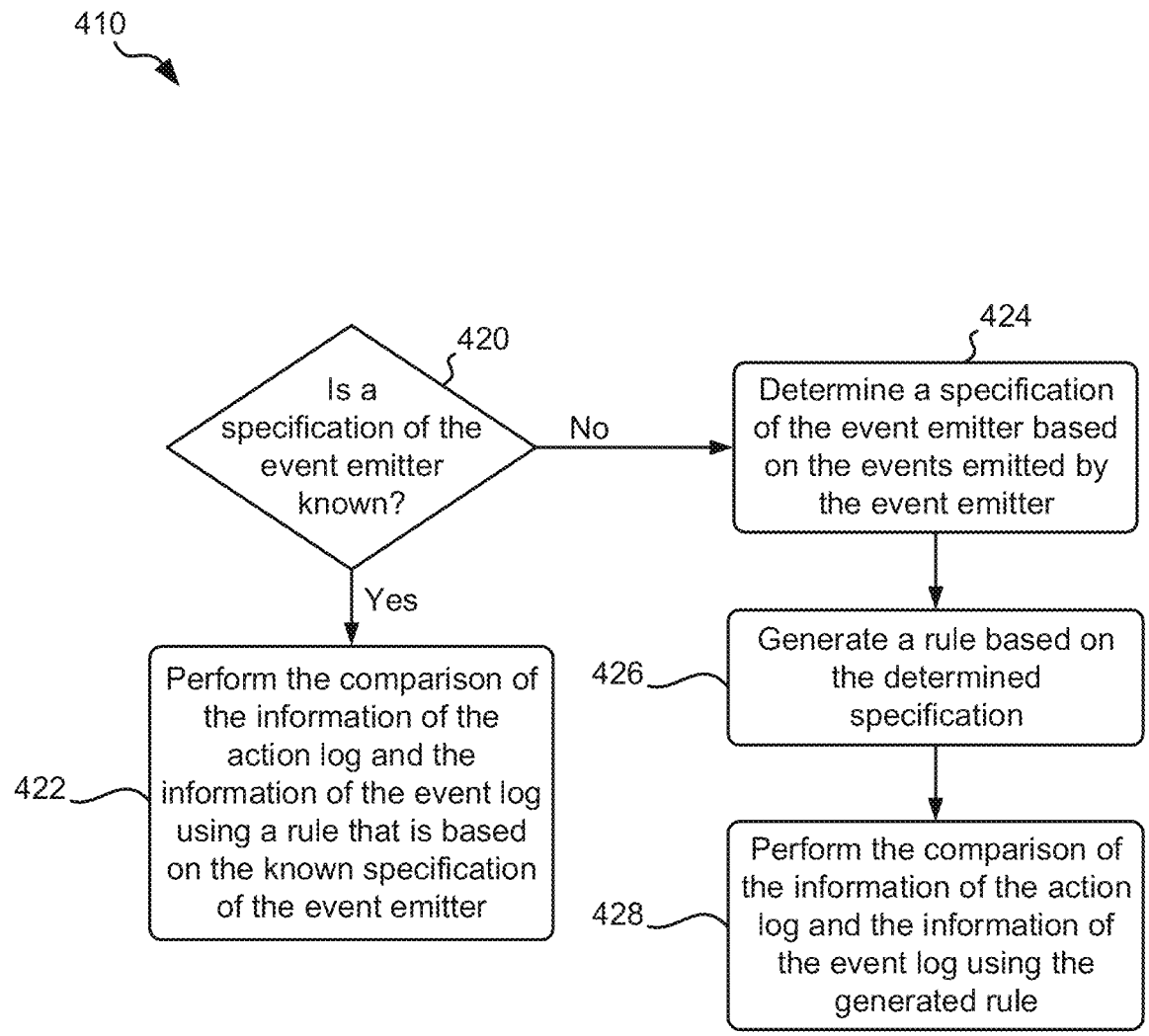
FIG. 4B is a flowchart of sub-operations of an operation of the flowchart of FIG. 4A.

It should be noted that in various approaches described herein, the determination of the validity of the event emitter may be based on a specification of the event emitter. More specifically, the rule of the event emitter may be based on the specification of the event emitter. For context, a specification of the event emitter may be defined by at least some, and preferably a plurality of, dimensions, e.g., medium, conditions, verbosity, timing, ordering, completeness, etc., that the event emitter is configured to emit events according to. In some approaches, the specification of the event emitter may be known, while in some other approaches, the specification of the event emitter may, at least initially, be unknown. Looking to FIG. 4B, exemplary sub-operations of operation 410 are illustrated in accordance with one embodiment, one or more of which may be used to perform operation 410 of FIG. 4A. More specifically, sub-operations of operation 410 are illustrated to describe how the comparison of operation 410 may be performed depending on whether or not the specification of the event emitter is known. However, it should be noted that the sub-operations of FIG. 4B are illustrated in accordance with one embodiment which is in no way intended to limit the invention.

Sub-operation 420 includes determining whether a specification of the event emitter is known. Such a determination may be performed using known techniques. In some other approaches, the determination may be based on whether or not a specification of the event emitter has been received.

In some approaches (as illustrated by the "Yes" logical path of sub-operation 420), the specification of the event emitter is known, e.g., predefined. Accordingly, the rule of the event emitter may be based on the known specification. In such an approach, the comparison of operation 410 may be performed using the rule that is based on the known specification, e.g., see sub-operation 422.

In some other approaches (as illustrated by the "No" logical path of sub-operation 420), the specification of the event emitter may be unknown. In response to a determination that the specification of the event emitter may be unknown, a specification of the event emitter may be determined, e.g., see sub-operation 424.

In some approaches, the specification of the event emitter may be unknown where the information of the action log is merely received, and method 400 may include instructing events to be emitted in order to generate information of the event log for the comparison. In such an approach, the specification of the event emitter may be determined based on how the event emitter performs. For example, determining the specification of the event emitter may include comparing information of the action log and information of the event log to determine whether the event emitter may be a throttling event emitter, e.g., which may be identified where the event log includes information that corresponds to only some of the information of the action log such that complete matching is not established during the comparing. Determinations of whether the event emitter is a throttling event emitter may in some approaches be made by probabilistically by running several experiments, or alternatively one experiment for some time, and thereafter making an educated guess based on the results. In contrast, the event emitter may be determined to maybe not be a throttling event emitter where all of the the action log information corresponds with unique information of the event log, e.g., a complete matching is established during the comparing. With the specification of the event emitter established, rules described elsewhere herein may be generated according to the determined specification and applied to a comparison of the information of the action log and the information of the event log in order to potentially validate the event emitter. In some approaches, the determined specification may be output, e.g., to a user device of a developer, to enable the developer to determine a validity of the event emitter. Note that the specification of the event emitter may additional and/or alternatively be determined by determining one or more dimensions, e.g., event emission medium, event conditions, verbosity, etc., of the event emitter during emission of the event emitter. Rules may additionally and/or alternatively be generated based on these determined dimensions in order to potentially validate the event emitter.

In some other approaches, the specification of the event emitter may be determined using known techniques for identifying one or more dimensions of event emitter, which may be based on, e.g., the events emitted by the event emitter, the information in the action log, the information in the event log, other events previously emitted by the event emitter, etc. The rule of the event emitter may be generated based on the determined specification, e.g., see sub-operation 426. Moreover, the comparison of the information of the action log and the information of the event log may be performed using the generated rule, e.g., see sub-operation 428.

Referring again to the method flowchart of FIG. 4A, the event emitter may be determined to be valid in response to a determination that the results of the comparing indicate that the events emitted by the event emitter satisfy the rule, e.g., the event emitter behaved according to a specification defined by the rule and/or one or more other predetermined dimensions during the emitting of the events. In contrast, the event emitter may be determined to be invalid in response to a determination that the results of the comparing indicate that the events emitted by the event emitter do not satisfy the rule, e.g., the event emitter did not conform to the specification during the emitting of the events. Such determinations of validity of the event emitter may be performed using techniques described elsewhere herein, e.g., see the techniques described elsewhere above for matching emitted events with observed events.

Various benefits are enabled as a result the techniques described herein for validating event emitters. For example, processing potential of a device such as a processor and/or a computer that is configured to emit events as a result of a driver performing one or more actions is preserved as a result of the techniques described herein ensuring that event emitters are validated. This is because errors caused by instances of dropped events and/or false events are avoided as a result of such event emitters being validated. It should be noted that comparing information of an action log and information of an event log based on a rule, and determining, based on results of the comparing, a validity of an event emitter has heretofore not been considered in event emitter and event observer systems. In fact, during testing of filesystems that did not utilize the techniques of various embodiments and approaches described herein, Inventors recorded observing each of the errors described elsewhere herein at some point in time. These errors were not observed by the Inventors as a result of implementing the teachings described herein to systems. It may also be noted that systems that strictly rely on event emitters emitting correctly, e.g., such as security systems, are safer and more reliable as a result of the techniques of various embodiments and approaches described herein. This is because an invalid event emitter causing false positive security breaches may otherwise result in mitigating resources being unnecessarily consumed and moreover loss of customers confidence in such systems. Using the techniques of various embodiments and approaches described herein however, such a problem is avoided because event emitters that would otherwise cause such an error are identified and may be corrected. Accordingly, the inventive discoveries disclosed herein with regards to use of rules for validating event emitters proceed contrary to conventional wisdom.

In some approaches, these benefits may be further realized in corrective steps that may be performed in response to a determination that an event emitter is not valid, e.g., is emitting events in a way that result in detected false events, detected errors, detected false positive events, etc. For example, method 400 may optionally include determining a predetermined corrective action for correcting the event emitter, e.g., for thereby causing the event emitter to emit in a valid manner. In one approach, determining a predetermined corrective action for correcting the event emitter may include accessing a table that includes a plurality of corrective actions that are each pre-associated with a type of result information. Accordingly, in response to a determination that the event emitter is invalid, a corrective action for the event emitter may be determined from the table using the results of the comparing of information of the action log and the information of the event log. An optional operation of method 400 may include instructing that the determined corrective action be performed on and/or by the event emitter, in order to enable the event emitter to thereafter be valid.

Figure 5A:
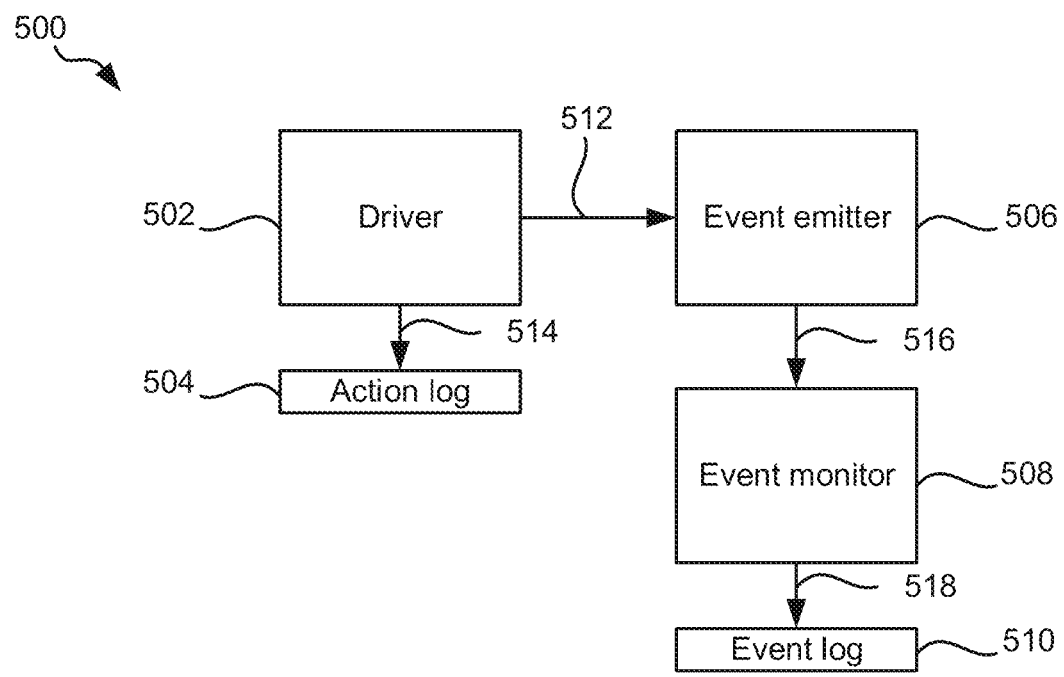
FIG. 5A is an overview of a system, in accordance with one embodiment.

FIG. 5A depicts a system 500, in accordance with one embodiment. FIG. 5A depicts a sub-portion 520 of system 500, in accordance with one embodiment. As an option, the present system 500 and sub-portion 520 may be implemented in conjunction with features from any other embodiment listed herein, such as those described with reference to the other FIGS. Of course, however, such system 500 and sub-portion 520 and others presented herein may be used in various applications and/or in permutations which may or may not be specifically described in the illustrative embodiments listed herein. Further, the system 500 and sub-portion 520 presented herein may be used in any desired environment.

Referring first to FIG. 5A, system 500 includes an event emitter 506 that is configured to evaluate conditions to determine whether or not to emit an event 516. Conditions may change as a result of actions 512 taken by some (typically external) driver 502. In some preferred approaches that are related to computer systems, the driver 502 may be a process.

Data associated with the driver 502 performing actions may be received, e.g., on a processor. At least some of the actions 512 preferably trigger events 516 emitted by the event emitter 506. Information about the performed actions may be logged in an action log 504, e.g., see logging 514. An event observer, e.g., see event monitor 508, may be instructed to log the events (emitted by the event emitter) that the event observer observes, e.g., see logging 518. For example, the observed events may be logged in an event log 510.

Figure 5B:
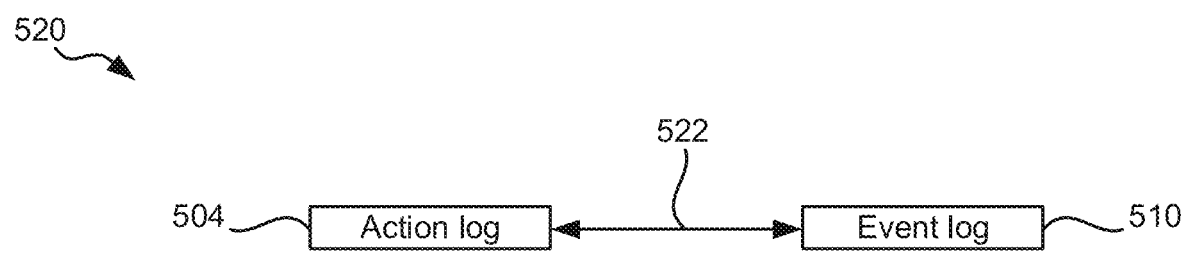
FIG. 5B is an overview a sub-portion of the system of FIG. 5A, in accordance with one embodiment.

Referring now to FIG. 5B, the sub-portion 520 of system 500 illustrates information of the action log 504 and information of the event log 510 being compared 522 based on a rule of the event emitter. Based on results of this comparing, a validity of the event emitter 506 may be determined, e.g., determined using techniques similar to those described in method 400 for determining the validity of an event emitter.

FIGS. 6A-6B depict comparisons 600 and 650 of information in an action log and information in an event log, in accordance with various embodiments. As an option, the present comparisons 600 and 650 may be implemented in conjunction with features from any other embodiment listed herein, such as those described with reference to the other FIGS. Of course, however, such comparisons 600 and 650 and others presented herein may be used in various applications and/or in permutations which may or may not be specifically described in the illustrative embodiments listed herein. Further, the comparisons 600 and 650 presented herein may be used in any desired environment.

Referring first to FIG. 6A, comparison 600 illustrates information collected as a result of a driver performing actions. More specifically, comparison 600 includes information 602 about the actions performed by the driver, where the information 602 was previously logged in an action log. The comparison 600 further includes information 604 about events that an event observer observed the event emitter make, where the information 604 was previously logged as events in an event log.

It may be noted that the information 602 of the action log is associated with eight actions made by the driver, e.g., see $L_1$-$L_8$, while the information 604 of the event log includes only four events, e.g., see $E_1$-$E_4$. For an example of a throttled event emitter, the information 602 would refer to the log of the driver program, e.g., the action log, and the information 604 may refer to the event log. A reason for the action log including half the number of the events that the event log includes is that the event log is a throttled event log, e.g., the event observer is instructed to only log half of the eight events that the event emitter is triggered to emit as a result of the actions by the driver.

A rule of the event emitter in such an approach may specify that the event emitter is to emit an event for every other one of the eight actions that the driver performs. Based on this rule, the event emitter may be validated when the information 602 of the action log and the information 604 of the event log are compared. This is because results of the comparing according to the rule indicate that an event was triggered in the event emitter for every other one of the eight driver actions. This is indicated in the results of the comparing, because the event observer logs successfully four events $E_1$-$E_4$ in the event log, e.g., one event logged in the event log for every two events that the event observer observes the event emitter emit.

Referring now to FIG. 6B, comparison 650 illustrates information collected as a result of a driver performing actions. More specifically, comparison 650 includes information 652 about the actions performed by the driver, where the information 652 was previously logged in an action log. The comparison 650 further includes information 654 about events that an event observer observed an event emitter make, where the information 654 was previously logged as events in an event log.

It may be noted that the information 602 of the action log is associated with four actions made by the driver, e.g., see $L_1$-$L_4$, while the information 654 of the event log includes only three events, e.g., see $E_2$-$E_4$. In the current approach it may be assumed that a rule of the event emitter specifies that the event emitter is to emit an event for every one of the actions that the driver performs. It may also be assumed that the event observer is a synchronous event observer, and therefore the event observer is instructed to log each of the events that the event observer observes the event emitter emit. Here, based on a comparison of the information 652 of the action log and the information 654 of the event log, the event emitter may be determined to be invalid. Such a determination may be made because the information 654 of the event log does not include information for each of the events emitted by the event emitter. This is because the information 654 of the event log only include information for three of the four events emitted by the event emitter. In the case of a synchronous, non-throttled event emitter, $E_m$ is missing, and this indicates a problem. Accordingly, event $E_m$ depicts an event that the event observer should have observed and logged information about in the event log, but did not, e.g., a missing event, based on an error of the event emitter. It may be determined that the event is missing because information corresponding to an action being performed that should have triggered an event to be emitted by the event emitter may be present in the action log, but information corresponding to the event being observed by the event observer may be absent from the event log.

Accordingly, because the rule cannot be satisfied with the event log information missing, the event emitter may be determined to be invalid.

Figure 7:
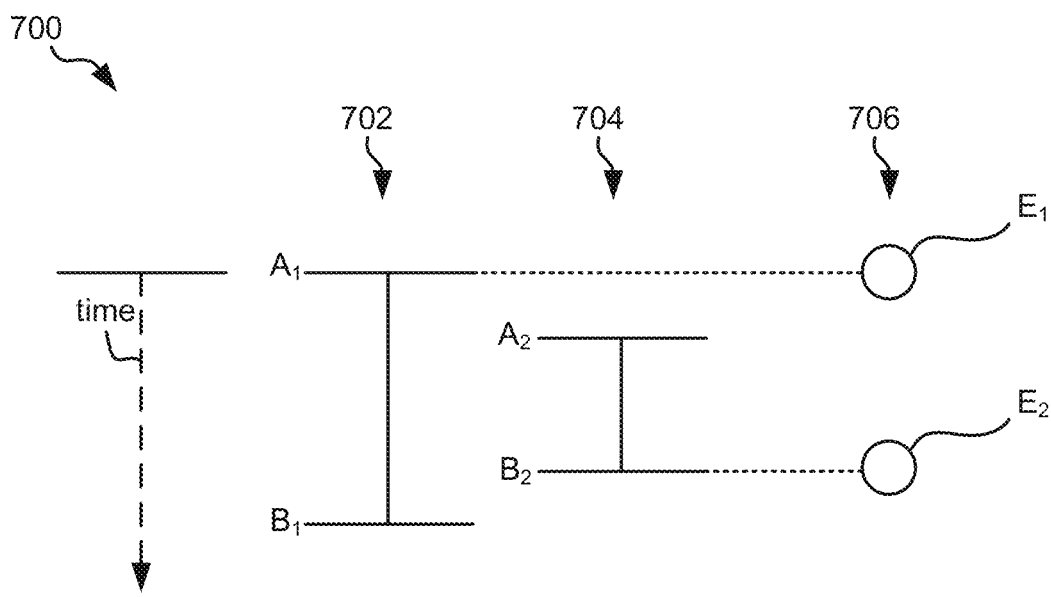
FIG. 7 depicts a temporal comparison of events being emitted by an event emitter and the events being observed by an event observer, in accordance with one embodiment.

FIG. 7 depicts a temporal comparison 700 of events being emitted by an event emitter and the events being observed by an event observer, in accordance with one embodiment. As an option, the present temporal comparison 700 may be implemented in conjunction with features from any other embodiment listed herein, such as those described with reference to the other FIGS. Of course, however, such temporal comparison 700 and others presented herein may be used in various applications and/or in permutations which may or may not be specifically described in the illustrative embodiments listed herein. Further, the temporal comparison 700 presented herein may be used in any desired environment.

Temporal comparison 700 includes a time axis, e.g., see time. A first action 702 is performed by a driver, which is represented temporally with a starting time $A_1$ of the first action 702 and an ending time $B_1$ of the first action 702. Moreover, a second action 704 is performed by the driver, which is represented temporally with a starting time $A_2$ of the second action 704 and an ending time $B_2$ of the second action 704. In the current embodiment the second action 704 begins after the starting time $A_1$ of the first action 702 and ends before the ending time $B_1$ of the first action 702. In one approach, a rule of the event emitter in temporal comparison 700 may be based on a synchronous guarantee. For example, the synchronous guarantee may specify that events are guaranteed to be emitted during the lifetime of the triggering action. In temporal comparison 700 it may be determined that two events emitted by the event emitter satisfy the synchronous guarantee, because the two events are observed and logged during a lifetime of a triggering action, e.g., see first event $E_1$ observed and logged as information 706 during a lifetime $A_1$-$B_1$ of the first action 702 and second event $E_2$ observed and logged as information 706 during a lifetime $A_2$-$B_2$ of the second action 704. In this approach, because the event emitter is determined to satisfy the synchronous guarantee, the event emitter may be determined to be valid. In another approach, a rule of the event emitter in temporal comparison 700 may additionally and/or alternatively be based on an ordering guarantee. For example, the ordering guarantee may specify that events are guaranteed to be emitted in some order consistent with the starting or ending times of the actions that produced them, e.g., ordered. In temporal comparison 700 it may be determined that two events emitted by the event emitter satisfy the ordering guarantee, because the two events are observed and logged in an order consistent with the starting or ending times of the actions that produced them, e.g., ordered. For example, the first event $E_1$ is observed and logged at the starting time $A_1$ of the first action 702. Moreover, the second event $E_2$ is observed and logged at the ending time $B_1$ of the second action 704. In this approach, because the event emitter is determined to satisfy the event ordering guarantee, the event emitter may be determined to be valid.

Figure 8:
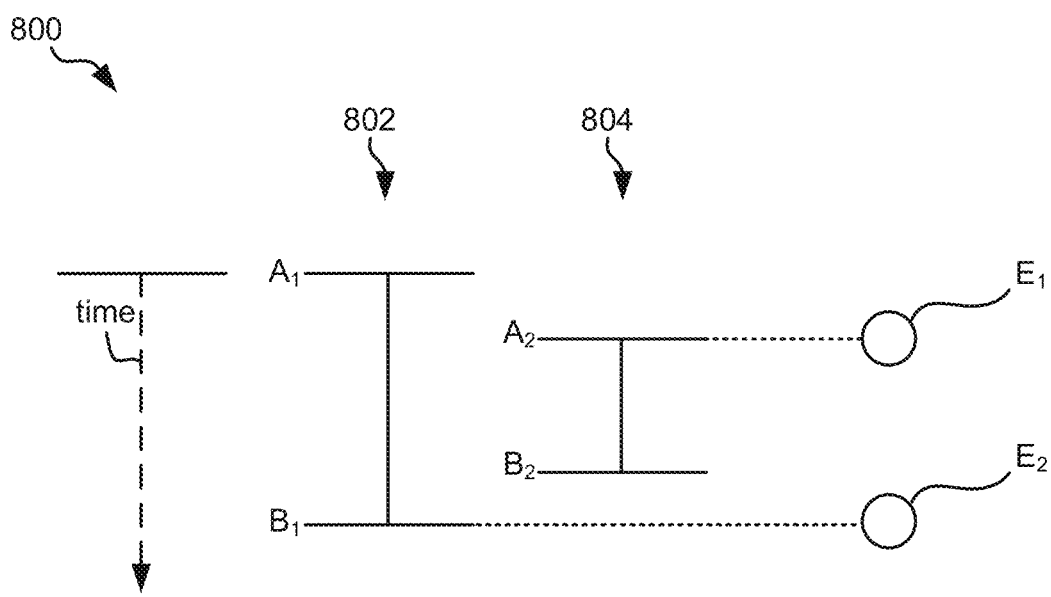
FIG. 8 depicts a temporal comparison of actions being performed by a driver and events being observed by an event observer, in accordance with one embodiment.

FIG. 8 depicts a temporal comparison 800 of actions being performed by a driver and events being observed by an event observer, in accordance with one embodiment. As an option, the present temporal comparison 800 may be implemented in conjunction with features from any other embodiment listed herein, such as those described with reference to the other FIGS. Of course, however, such temporal comparison 800 and others presented herein may be used in various applications and/or in permutations which may or may not be specifically described in the illustrative embodiments listed herein. Further, the temporal comparison 800 presented herein may be used in any desired environment.

Temporal comparison 800 includes a time axis, e.g., see time. A first action 802 is performed by a driver, which is represented temporally with a starting time $A_1$ of the first action 802 and an ending time $B_1$ of the first action 802. Moreover, a second action 804 is performed by the driver, which is represented temporally with a starting time $A_2$ of the second action 804 and an ending time $B_2$ of the second action 804. In the current embodiment the second action 804 begins after the starting time $A_1$ of the first action 802 and ends before the ending time $B_1$ of the first action 802. In one approach, a rule of the event emitter in temporal comparison 800 may be based on a synchronous guarantee. For example, the synchronous guarantee may specify that events are guaranteed to be emitted during the lifetime of the triggering action. In temporal comparison 800 it may be determined that two events emitted by the event emitter satisfy the synchronous guarantee, because the two events are observed and logged during a lifetime of a triggering action, e.g., see the first event $E_1$ observed and logged during a lifetime $A_1$-$B_1$ of the first action 802 and second event $E_2$ observed and logged during a lifetime $A_2$-$B_2$ of the second action 804. In this approach, because the event emitter is determined to satisfy the synchronous guarantee, the event emitter may be determined to be valid. In another approach, a rule of the event emitter in temporal comparison 800 may additionally and/or alternatively be based on an ordering guarantee. For example, the ordering guarantee may specify that the event emitter makes no guarantee about the order of events relative to the triggering actions, e.g., unordered. In temporal comparison 800 it may be determined that two events emitted by the event emitter are emitted without a guarantee about the order of events relative to the triggering actions. This is because although the starting time $A_1$ of the first action 802 begins before the starting time $A_2$ of the second action 804, the second event $E_2$ is observed and logged by the event observer before the first event $E_1$ is observed and logged. In this approach, because the event emitter is determined to satisfy the event ordering guarantee, the event emitter may be determined to be valid.

Figure 9A:
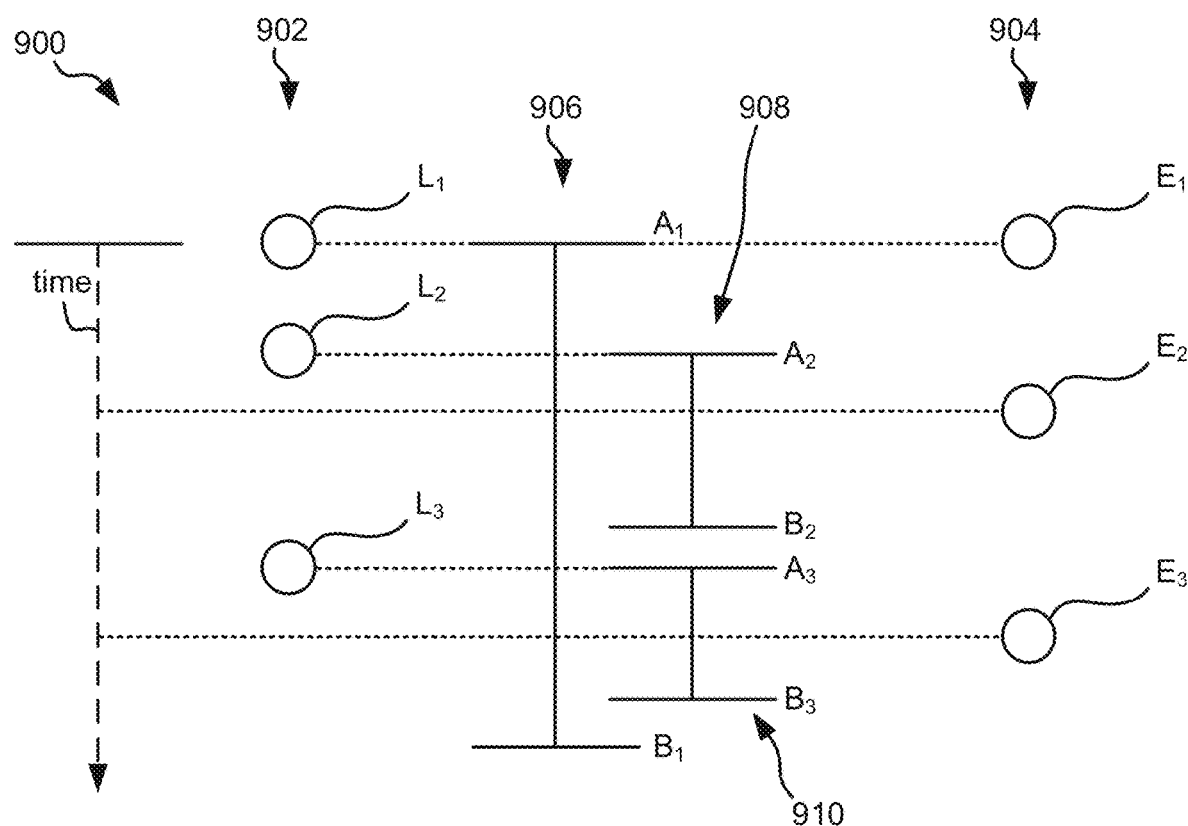
FIG. 9A depicts a temporal comparison of actions and observed events, in accordance with one embodiment.
Figure 9B:
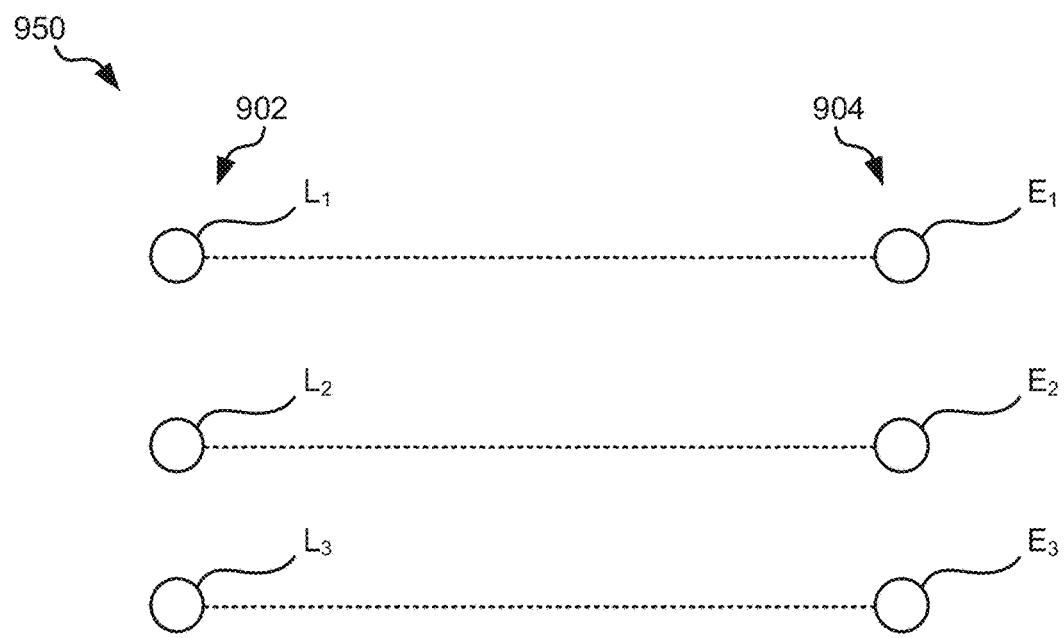
FIG. 9B depicts a comparison of information of an action log with information of the event log of FIG. 9A, in accordance with one embodiment.

FIG. 9A depicts a temporal comparison 900 of actions and observed events, and FIG. 9B depicts a comparison 950 of information of an action log with information of an event log of FIG. 9A, in accordance with one embodiment. As an option, the present comparisons 900 and 950 may be implemented in conjunction with features from any other embodiment listed herein, such as those described with reference to the other FIGS. Of course, however, such comparisons 900 and 950 and others presented herein may be used in various applications and/or in permutations which may or may not be specifically described in the illustrative embodiments listed herein. Further, the comparisons 900 and 950 presented herein may be used in any desired environment.

Comparison 900 illustrates information collected as a result of a driver performing actions. More specifically, comparison 900 includes information 902 about the actions performed by the driver, e.g., see actions 906, 908 and 910. The information 902 may be logged in an action log. The comparison 900 further includes information 904 about events that are triggered to be emitted by an event emitter as a result of the actions 906, 908 and 910 being performed by the driver. The information 904 about the observed events may be logged in an event log by the event observer.

The information 902 about the actions performed by the driver includes three entries $L_1$, $L_2$, and $L_3$, that are each associated with a different one of the actions 906, 908 and 910 (respectively). Furthermore, the information 904 about the events includes three logged events $E_1$, $E_2$ and $E_3$ that the event observer observed the event emitter emit as a result of being triggered by the actions 906, 908 and 910 (respectively).

Referring now to FIG. 9B, the information 902 of the action log is compared with the information 904 of the event log according to a rule. More specifically, the comparing includes performing matching of the entries $L_1$, $L_2$, and $L_3$ of the information 902 with the logged events $E_1$, $E_2$ and $E_3$. Based on the results of the comparing indicating that each of the entries $L_1$, $L_2$, and $L_3$ of the information 902 is matched with one of logged events $E_1$, $E_2$ and $E_3$ it may be determined that the event emitter is valid.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving data associated with a driver performing actions, wherein at least some of the actions trigger events emitted by an event emitter;
   logging, from the received data, information about the performed actions in an action log;
   instructing an event observer to log the events emitted by the event emitter that the event observer observes, wherein the observed events are logged in an event log;
   comparing the information of the action log and information of the event log based on a rule; and
   determining, based on results of the comparing, a validity of the event emitter.

2. The computer-implemented method of claim 1, wherein the rule is based on a timing guarantee.

3. The computer-implemented method of claim 2, wherein the timing guarantee specifies that each of the events must be emitted by the event emitter during performance of a corresponding one of the actions by the driver.

4. The computer-implemented method of claim 2, wherein the timing guarantee specifies that each of the events cannot be emitted by the event emitter before a corresponding one of the actions begins.

5. The computer-implemented method of claim 1, wherein the rule is based on ordering guarantees, and comprising: building a bipartite graph with events in a first set and actions in a second set; and adding edges between nodes in each of the sets according to time rule and equality rules, wherein determining the validity of the event emitter is based on whether a maximal bipartite match is identified in the comparison of the information, wherein the event emitter is determined to valid in response to a determination that a maximal bipartite match is identified in the comparison of the information.

6. The computer-implemented method of claim 1, wherein the rule is based on a completeness guarantee of the event emitter that each event-triggering action yields an event, wherein the rule specifies that a size of a maximal match is equal to the number of the actions performed and the number of events.

7. The computer-implemented method of claim 1, wherein the rule is based on a known specification of the event emitter, wherein the event emitter is determined to be valid in response to a determination that the results of the comparing indicate that the events emitted by the event emitter satisfy the rule.

8. The computer-implemented method of claim 1, wherein a specification of the event emitter is unknown, and comprising: determining a specification of the event emitter based on the events emitted by the event emitter, wherein the rule is generated based on the determined specification, wherein the event emitter is determined to be valid in response to a determination that the results of the comparing indicate that the events emitted by the event emitter satisfy the rule.

9. A computer program product, the computer program product comprising a computer readable storage medium having program instructions embodied therewith, the program instructions readable and/or executable by a processor to cause the processor to:
   receive, by the processor, data associated with a driver performing actions, wherein at least some of the actions trigger events emitted by an event emitter;
   log, by the processor, from the received data, information about the performed actions in an action log;
   instruct, by the processor, an event observer to log the events emitted by the event emitter that the event observer observes, wherein the observed events are logged in an event log;
   compare, by the processor, the information of the action log and information of the event log based on a rule; and
   determine, by the processor, based on results of the comparing, a validity of the event emitter.

10. The computer program product of claim 9, wherein the rule is based on a timing guarantee.

11. The computer program product of claim 10, wherein the timing guarantee specifies that each of the events must be emitted by the event emitter during performance of a corresponding one of the actions by the driver.

12. The computer program product of claim 10, wherein the timing guarantee specifies that each of the events cannot be emitted by the event emitter before a corresponding one of the actions begins.

13. The computer program product of claim 9, wherein the rule is based on ordering guarantees, and the program instructions readable and/or executable by the processor to cause the processor to: build, by the processor, a bipartite graph with events in a first set and actions in a second set; and add, by the processor, edges between nodes in each of the sets according to time rule and equality rules, wherein determining the validity of the event emitter is based on whether a maximal bipartite match is identified in the comparison of the information, wherein the event emitter is determined to valid in response to a determination that a maximal bipartite match is identified in the comparison of the information.

14. The computer program product of claim 9, wherein the rule is based on a completeness guarantee of the event emitter that each event-triggering action yields an event, wherein the rule specifies that a size of a maximal match is equal to the number of the actions performed and the number of events.

15. The computer program product of claim 9, wherein the rule is based on a known specification of the event emitter, wherein the event emitter is determined to be valid in response to the results of the comparing indicating that the events emitted by the event emitter satisfy the rule.

16. The computer program product of claim 9, wherein a specification of the event emitter is unknown, and the program instructions readable and/or executable by the processor to cause the processor to: determine, by the processor, a specification of the event emitter based on the events emitted by the event emitter, wherein the rule is generated based on the determined specification, wherein the event emitter is determined to be valid in response to the results of the comparing indicating that the events emitted by the event emitter satisfy the rule.

17. A system, comprising:
a processor; and
logic integrated with the processor, executable by the processor, or integrated with and executable by the processor, the logic being configured to:
receive data associated with a driver performing actions, wherein at least some of the actions trigger events emitted by an event emitter;
log, from the received data, information about the performed actions in an action log;
instruct an event observer to log the events emitted by the event emitter that the event observer observes, wherein the observed events are logged in an event log;
compare the information of the action log and information of the event log based on a rule; and
determine based on results of the comparing, a validity of the event emitter.

18. The system of claim 17, wherein the rule is based on a timing guarantee.

19. The system of claim 18, wherein the timing guarantee specifies that each of the events must be emitted by the event emitter during performance of a corresponding one of the actions by the driver.

20. The system of claim 18, wherein the timing guarantee specifies that each of the events cannot be emitted by the event emitter before a corresponding one of the actions begins.

* * * * *